(12) United States Patent
Liu et al.

(10) Patent No.: US 10,148,776 B2
(45) Date of Patent: Dec. 4, 2018

(54) CLICKSTREAM VISUAL ANALYTICS BASED ON MAXIMAL SEQUENTIAL PATTERNS

(71) Applicant: ADOBE SYSTEMS INCORPORATED, San Jose, CA (US)

(72) Inventors: Zhicheng Liu, Redwood City, CA (US); Alan Wilson, Cedar Hills, UT (US); Matthew Hoffman, San Francisco, CA (US); Lubomira Dontcheva, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 255 days.

(21) Appl. No.: 15/047,339

(22) Filed: Feb. 18, 2016

(65) Prior Publication Data

US 2017/0244796 A1 Aug. 24, 2017

(51) Int. Cl.
| | |
|---|---|
| *G06F 15/173* | (2006.01) |
| *H04L 29/08* | (2006.01) |
| *G06F 3/0481* | (2013.01) |
| *G06F 3/0484* | (2013.01) |

(52) U.S. Cl.
CPC ............ *H04L 67/22* (2013.01); *G06F 3/0481* (2013.01); *G06F 3/0484* (2013.01); *H04L 67/02* (2013.01)

(58) Field of Classification Search
CPC ....... H04L 67/22; H04L 67/02; G06F 3/0481; G06F 3/0484
See application file for complete search history.

(56) References Cited

U.S. PATENT DOCUMENTS

| | | | |
|---|---|---|---|
| 6,633,316 B1 * | 10/2003 | Maddalozzo, Jr. | ......................... G06F 17/30887 707/E17.115 |
| 9,213,990 B2 * | 12/2015 | Adjaoute | ................. H04L 67/22 |
| 2007/0288473 A1 * | 12/2007 | Mukherjee | ........ G06F 17/30873 |
| 2010/0123579 A1 * | 5/2010 | Midkiff | ............ G08B 13/19652 340/541 |
| 2013/0073509 A1 * | 3/2013 | Burkard | ............ G06F 17/30864 706/52 |
| 2015/0199738 A1 * | 7/2015 | Jung | .................. G06Q 30/0609 705/26.35 |
| 2015/0201031 A1 * | 7/2015 | James | ..................... H04L 67/22 709/224 |
| 2016/0307220 A1 * | 10/2016 | Sato | ................... G06Q 30/0202 |

* cited by examiner

*Primary Examiner* — Richard G Keehn
(74) *Attorney, Agent, or Firm* — Shook, Hardy & Bacon, L.L.P.

(57) ABSTRACT

Systems and methods are disclosed for analyzing a plurality of clickstreams associated with a resource to identify popular navigational patterns traversed by users of the resource. The analysis provides a navigational framework for performing continued analysis on segmented portions of the identified navigational patterns. To facilitate the analysis, clickstreams associated with the resource are analyzed to identify sets of clickstreams that have a common group of assets with which users of the resource interacted. Navigational patterns, which include commonly traversed series of assets interacted with by the users, are determined for the identified sets. The navigational pattern is then provided to identify popular navigational patterns traversed by users of the resource.

17 Claims, 10 Drawing Sheets

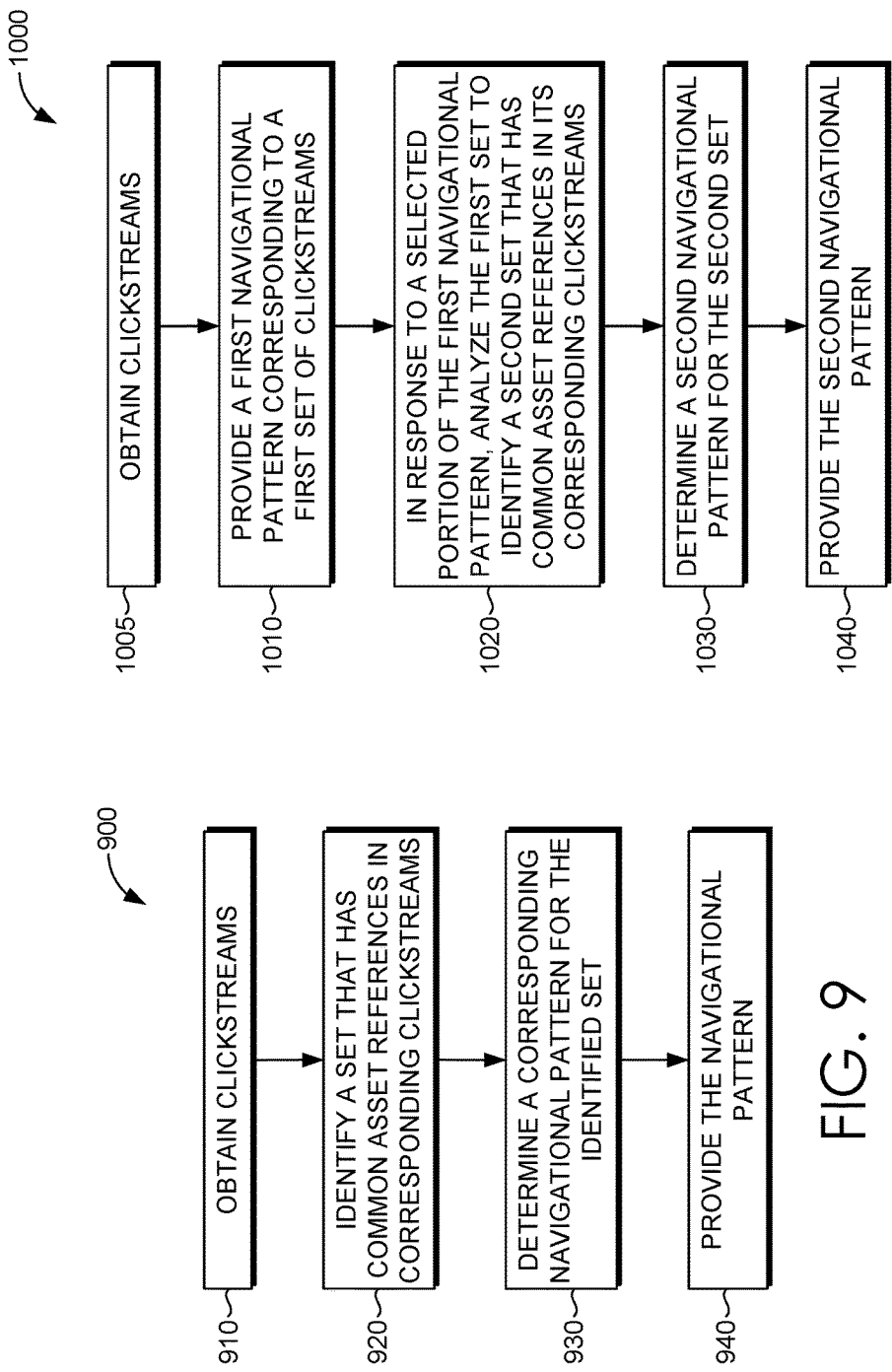

CLICKSTREAM VISUAL ANALYTICS BASED ON MAXIMAL SEQUENTIAL PATTERNS

BACKGROUND

A clickstream is an automatically-generated log of a user's interactions with a resource, such as a website or a software application. As a user is navigating a resource, the clickstream typically keeps record of, among other things, parts of the resource with which the user interacts (e.g., accesses, views, etc.), temporal data associated with those user interactions, assets of the resource interacted with by the user, and/or other details related to navigational characteristics of the user. Analysts and developers can analyze clickstreams associated with many different users, for purposes of testing software, conducting market research, analyzing employee productivity, and the like. As modern websites and software applications grow in size and complexity, the clickstreams associated therewith can become increasingly voluminous. To this end, the amount of data collected for analysis can be rather overwhelming. While traditional clickstream analytics applications attempt to summarize clickstreams, these general summarizations (e.g., simple flow diagrams) are insufficient because they are not designed to summarize voluminous amounts of data. In other words, traditional methods cannot concisely summarize clickstreams when provided with copious amounts of data.

SUMMARY

Embodiments described herein are directed to analyzing clickstream data to identify navigational patterns therein, and further to provide, for display, visual summaries of the patterns in an easily navigable interface. More specifically, clickstreams associated with a resource, such as a website or a software application, are analyzed to identify navigational patterns in the data. The navigational patterns can reveal, among other things, popular navigational routes taken by users of the resource. The navigational patterns, each having one or more navigational steps that make up the pattern, can be provided for display to reveal a visual summary of the data. An input corresponding to one of the navigational steps can be received to initialize further analysis of the clickstream, identifying more navigational patterns in the data that correspond to the selected step. In this way, the clickstream data can be represented visually, and can further provide analysts with an easy-to-navigate interface for pinpointing path segments of interest for further analysis.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 9 is a flow diagram showing a method for analyzing clickstreams to provide a navigational framework based on identified patterns, in accordance with some implementations of the present disclosure;

FIG. 10 is a flow diagram showing another method for analyzing clickstreams and providing a navigational framework for performing a segmented analysis therewith, in accordance with some implementations of the present disclosure;

DETAILED DESCRIPTION

Figure 1:
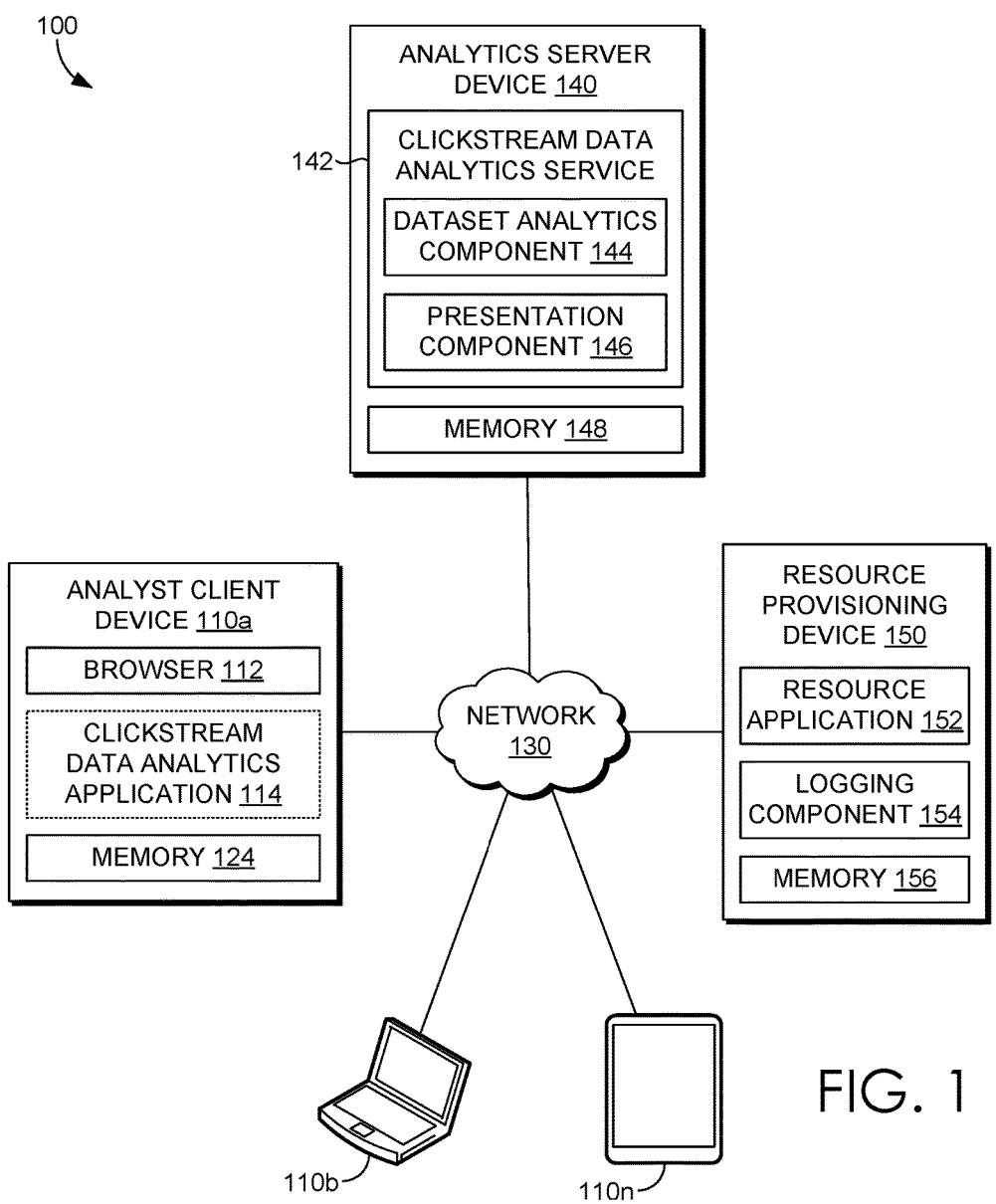
FIG. 1 is a diagram illustrating an exemplary clickstream data analytics system, in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Traditional clickstream analytics applications are configured to organize and display a collection of clickstreams associated with a resource. In some instances, clickstream analytics applications analyze clickstream data for visual representation to a user (e.g., an analyst), by generating graphical representations of entire clickstreams utilizing basic flow diagrams, for instance. As will be referenced herein, an "analyst" can be a person that at least views the visual representations generated by the clickstream analytics application.

As technology advances, however, resources become more complex and consequently include a growing number of assets that can be tracked for purposes of clickstream analytics. In this regard, the task of organizing and reviewing large amounts of complex clickstreams becomes increasingly difficult. As the basic analytical methodologies become insufficient for analyzing large quantities of clickstreams, a method for analyzing large quantities of clickstreams and representing them in an easily understandable and intuitive interface would be beneficial.

Disclosed are systems and methods for facilitating the analysis of clickstream data. More specifically, embodiments are directed to facilitating clickstream analytics using navigational patterns identified within clickstream data. In other words, embodiments described herein analyze clickstreams to identify navigational patterns that are common to some, if not all, users of a resource based on their respective clickstreams. For instance, and by way of a non-limiting example, assume ten different users had independently navigated through a website that included webpages "A.html," "B.html," "C.html," "D.html," "E.html," etc., continuing on to "Z.html." Now assume that the clickstream (or "clickstream data") for each user indicates that the users start at "A.html" and take various paths getting to "D.html," without accessing a common webpage (such as "B.html") on the way to "D.html," but all users ultimately end their browsing sessions at any of the webpages "F.html" through "Z.html." In such a case, at least one navigational step of a navigational pattern that is common to the users may be identified as "'A.html' to 'D.html.'" In this regard; each navigational step indicates a commonly traversed series of webpages visited by each user, based on their respective clickstreams. A navigational pattern that is common to each clickstream in any given set of clickstreams may include a series of navigational steps. In some instances, a navigational pattern may include only one navigational step, such as the above example where the identified navigational step is "'A.html' to 'D.html.'"

A clickstream generally includes records detailing various interactions made between a user and the assets of a resource. In other words, the clickstream is a "log" of sorts, which keeps a record of when a user accesses various assets of the resource. A resource can be any electronic resource with assets that comprises a user interface configured for interaction with a user(s). Resources can have a number of assets that are available for consumption by the user and/or presented for interaction with the user. For example, a resource can be a website or a software application, while its corresponding assets can be a collection of webpages, website sections, application user interfaces, or sections of an application. As will be referenced herein, a user "accessing" an asset can include any interaction between a user and the asset of a resource. For example, a user can "access" a webpage of a website by visiting its URL, clicking a hyperlink, or moving forward/backward in a browsing session. In another example, a user can "access" a particular button, menu, interface, etc., of a software application by clicking button(s), inputting hotkey(s), or navigating through various control button(s).

Clickstreams are typically collected by a logging component (e.g., a script or software component) of the resource, which can be configured to gather data about the user's interactions with the resource. More specifically, as a user interacts with the resource by accessing the assets thereof, the logging component can generate the clickstream by logging details related to the interactions in the same order that they occur. By way of example only, if a user is clicking through various webpages of a website, the logging component can be configured to record, in a clickstream, webpages visited by the user, the date and amount of time the user spends on each webpage, the order each webpage was visited by the user, and the like. In some instances, a clickstream can include more detailed information about the user, such as a unique identifier associated with the user, detected computing device and software information, or other notable user actions associated with the resource.

In some aspects, a clickstream is a user activity log that keeps record of an individual user's interactions with the various assets of the resource. In essence, the clickstream maintains, among other things, an ordered listing of assets that are accessed and/or interacted with, by a user of the resource. The clickstream can be analogized with, or even embodied as, a database table that includes a series of unique records that each describes a user's "interaction with" or "accessing of" an asset of the resource. By way of example, if in a web-browsing session a user accesses ten webpages of a website, one impression for each webpage, the corresponding clickstream may include ten different records, each referencing, among other things, a particular webpage accessed by the user, a time the user accessed the webpage, and an amount of time the user spent on the webpage before moving to the next page. The records of the clickstream are typically ordered in accordance with the time they are generated. In other words, the records are ordered based on times that the assets (e.g., webpages), referenced by the records, were accessed by the user. In this regard, the clickstream provides a detailed log of the user's interactions with the resource and its assets. While embodiments described herein reference a clickstream as being associated with an individual user, it is contemplated that some clickstreams may also be associated with a group of users.

Turning now to FIG. 1, a diagram is provided illustrating an exemplary system 100 in accordance with implementations of the present disclosure. The system 100 can be a client-only or a client-server system that can be utilized to interactively facilitate clickstream data analytics. Among other components not shown, the system 100 can include any number of client devices, such as analyst client devices 110a and 110b through 110n, network 130, one or more remote server devices 140, and one or more resource provisioning devices 150. The resource provisioning device(s) 150 can comprise one or more client devices, one or more server devices, or any combination thereof. It should be understood that any number of servers and client devices may be employed within system 100 within the scope of the present disclosure. Each may comprise a single device or multiple devices cooperating in a distributed environment. Additionally, other components not shown may also be included within the distributed environment.

It should further be understood that system 100 shown in FIG. 1 is an example of one suitable computing system architecture. Each of the servers and client devices shown in FIG. 1 may be implemented via a computing device, such as computing device 1200, later described with reference to FIG. 12, for example. The components may communicate with each other via network 130.

Network 130 may be wired, wireless, or both. Network 130 may include multiple networks, or a network of networks, but is shown in simple form so as not to obscure aspects of the present disclosure. By way of example, network 130 can include one or more wide area networks (WANs), one or more local area networks (LANs), one or more public networks, such as the Internet, and/or one or more private networks. Where network 130 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 130 is not described in significant detail.

In various implementations, analyst client devices 110a and 110b through 110n are computing devices that are capable of accessing the Internet, such as the World Wide Web. Analyst client devices might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

Analyst client devices 110a and 110b through 110n can include one or more processors, and one or more computer-readable media. The computer-readable media may include computer-readable instructions executable by the one or more processors. The instructions may correspond to one or more applications, such as browser 112 or a clickstream data analytics application 114 configured to receive and/or provide for display analytics data provided by the clickstream data analytics service 142, as will be described. Analyst client devices can be utilized by one or more analysts for at least viewing data generated by the clickstream data analytics service 142.

Browser 112, such as a web browser, can be an HTTP-compatible application (e.g. an Application that supports an HTTP or HTTPS protocol). A specific example of browser 112 is the Google® Chrome® web browser. Clickstream data analytics application 114 may be a standalone analytics application installed on the analyst client device 110a, or can be accessed through a web-based application hosted by analytics server device 140 or other server(s) (not shown) and accessible to analyst client devices 110a, 110b, 110n by the browser 112. In some instances, the clickstream data analytics application 114 can be accessible over the web (e.g., a dynamic web application or a cloud-based web application) through the browser 112. Accessing the clickstream data analytics application 114 over the web can be accomplished on the analyst client device 110a by visiting a Uniform Resource Identifier (URI or URL) to receive code (e.g., HTML) for rendering, the code being dynamically generated by the analytics server device 140 and communicated to the analyst client device 110a over the network 130.

The analytics server device 140 can include one or more server computing device(s) configured in a network environment, or can include a single computing device hosting, in some embodiments, an application service, such as the clickstream data analytics service 142. Each server computing device can include one or more processors, and one or more computer-readable media. The computer-readable media may include computer-readable instructions executable by the one or more processors. The instructions may correspond to one or more application services, such as clickstream data analytics service 142. The analytics server device 140 can be configured to store in a memory 148, among other things, computer-readable instructions for hosting the clickstream data analytics service 142, and in some instances, clickstream data. The memory can be comprised of one or more computer-readable media, or may comprise one or more database(s) (not shown) for storing data, as can be appreciated by one of ordinary skill in the art. In some embodiments, the analyst server device 140 can also be operable as the analyst client device 110a, in that one or more analysts can perform all operations as described with respect to the analyst client device 110a on the analyst server device 140.

As will be described in more detail with reference to FIG. 2, the clickstream data analytics service 142 can include a dataset analysis component 144 and a presentation component 146, as shown on analytics server device 140. The analytics server device 140 can be configured to store in memory 148, among other things, clickstream data (i.e., clickstreams) for analysis by the clickstream data analytics service 142. In some embodiments, analytics server device 140 can be configured to receive and/or retrieve remotely stored clickstream data for analysis by the clickstream data analytics service 142. For instance, the clickstream data can be stored in a memory 156 on the one or more resource provisioning devices 150, or in some instances, in a remote storage location like a cloud storage device (not shown).

The analytics server device 140 can comprise a web server, such as Apache®, IIS®, Nginx®, or GWS®, among others, and can be configured to communicate over the network 130 to provide application services for facilitating clickstream data analytics to analysts using an analyst client device 110a. While the standard network protocol for communication is HTTP, it is contemplated that any network protocol can be used to distribute information between the analytics server device 140 and the browser 112 or clickstream data analytics application 114 of analyst client device 110a. In more detail, if the clickstream data analytics application 114 is communicated as a dynamic web application to the analyst client device 110a over the World Wide Web and accessed via browser 112, the analytics server device 140 can be configured to provide dynamic code, or the like, to analysts for navigating a workflow directed to clickstream data analytics. If the clickstream data analytics application 114 is a standalone application installed on the analyst client device 110a, in some embodiments, the analytics server device 140 can be configured to provide application services for storing, retrieving, processing, and/or presenting clickstream data and/or other relevant information, as stored in memory 148, by the clickstream data analytics service 142.

The resource provisioning device(s) 150 can include one or more server devices and/or one or more client devices configured to provide non-analyst users with access to a resource (e.g., a website or a software application). For example, the resource provisioning device can be a web-server configured to host a website and provide access thereto, to the like of non-analyst users, and further configured to track each non-analyst user's navigational path of the website. The navigational paths can be tracked by generating a clickstream for each non-analyst user. In another example, the resource provisioning device can be any one or more client devices that each has a software application executing thereon. The software application can be configured for interaction with the like of non-analyst users, and can further be configured to track each non-analyst user's navigational path of the software application. Similarly, the navigational paths can be tracked by generating a clickstream for each non-analyst user. As referenced herein, a "non-analyst user" is a person that is interacting with the resource application 152, as will be described. The non-analyst users are, in essence, the individuals that directly or indirectly source the clickstream data for analysis by the analysts. Although the term "non-analyst" is referred to herein as referencing an individual that interacts with a resource, it is contemplated that, in some cases, an "analyst" might be an individual that also interacts with the resource. In this regard, the analyst may also be a non-analyst user, while remaining within the ambit of the present disclosure.

The resource provisioning device(s) 150 can include one or more processors, and one or more computer-readable media. The computer-readable media may include computer-readable instructions executable by the one or more processors. The instructions may correspond to one or more applications, such as a resource application 152 and a logging component 154. The resource application 152 can provide non-analyst users with access to various assets of a resource. The resource application 152 can also include a logging component 152, which can gather data about different non-analyst users' interactions with the resource, and store such data in a memory 156. More specifically, as one or more non-analyst users interact with the resource application 152, the logging component 154 can generate a clickstream for each user, by logging details associated with each user interaction as it occurs.

In some embodiments, the resource can be a collection of electronic information (e.g., a website, a database, etc.). For example, the resource provisioning device 150 can be a server device executing a resource application 152. More particularly, the resource application 152 can be a web server application configured to provide non-analyst users with access to webpages (i.e., the assets) associated with a website or domain (i.e., the resource). The non-analyst users can interact with the resource application 152 (e.g., a web server application) by browsing the website. For example, browsing may include sending and/or receiving web data, such as HTTP requests, HTML pages, dynamic app data, dynamic script data, and the like. As a non-analyst user accesses various webpages of a website, the logging component 154 can be configured to record, in a clickstream associated with the user, webpages visited by the non-analyst user, a timestamp each webpage was accessed, the amount of time the non-analyst user spends on each webpage, the order each webpage was visited by the non-analyst user, and the like. In some instances, clickstreams can include more detailed information about the non-analyst user, such as a unique identifier associated with the non-analyst user, detected computing device and software (e.g., operating system or browser) information, and other notable actions associated with the resource.

In some other embodiments, the resource can be a collection of interactive modules. The interactive modules may include user interfaces, control interfaces, buttons, menus, media, scroll bars, etc. For example, the resource provisioning device 150 can be a client device executing a resource application 152. More particularly, the resource application 152 can be any software application configured to provide the like of non-analyst users with access to various interactive modules thereon. The non-analyst users can interact with the resource application 152 (e.g., the software application) by utilizing the software application as it was intended. If the non-analyst user is "interacting with" (e.g., clicking, touching, mouse-over, scrolling, hovering over, selecting, deselecting, etc.) various interactive modules of a software application, the logging component 154 can be configured to record, in a clickstream associated with the non-analyst user, interactive modules interacted with or accessed, a timestamp each interactive module was accessed or interacted with, the amount of time the non-analyst user accessed or interacted with each interactive module, the order each interactive module was accessed or interacted with, and the like. As logging components 152 for resource applications 152 are generally known in the art, further description related to such will not be provided herein in any more detail.

While the exemplary system 100 illustrates individual analytics server device 140 and resource provisioning device 150, it is contemplated that in embodiments where the resource provisioning device 150 is a server device (e.g., a web server), the analytics server device 140 and the resource provisioning device 150 can, in some embodiments, be the same server device. For example, a web server that is configured to provide non-analyst users with access to a website, while generating clickstream data associated therewith, can also be configured to provide analyst users with access to a clickstream data analytics service 142 executing thereon, for facilitating clickstream data analytics utilizing at least the clickstream data generated thereby.

Looking now to FIG. 2, the clickstream data analytics service 200 is configured with various components, as will be described herein, so as to facilitate clickstream analytics using navigational patterns identified within clickstream data. The clickstream data analytics service 200 can include, among other things, a dataset analysis component 210 and a presentation component 220. The dataset analysis component 210 can be configured to analyze clickstreams for identifying navigational patterns that are common to some, if not all, users. While the dataset analysis component 210 can be configured to analyze clickstreams associated with various resources, the clickstreams being analyzed by the dataset analysis component 210 in any given analytics process, are generally associated with one particular resource. The clickstreams being analyzed by the clickstream data analytics service 200, the identified navigational patterns, and/or other information generated by way of the clickstream data analytics service 200, can be received by and/or stored on a computer readable medium, or retrieved from and/or stored on a remote computing device over a network (for instance, resource provisioning device 150).

Figure 3:
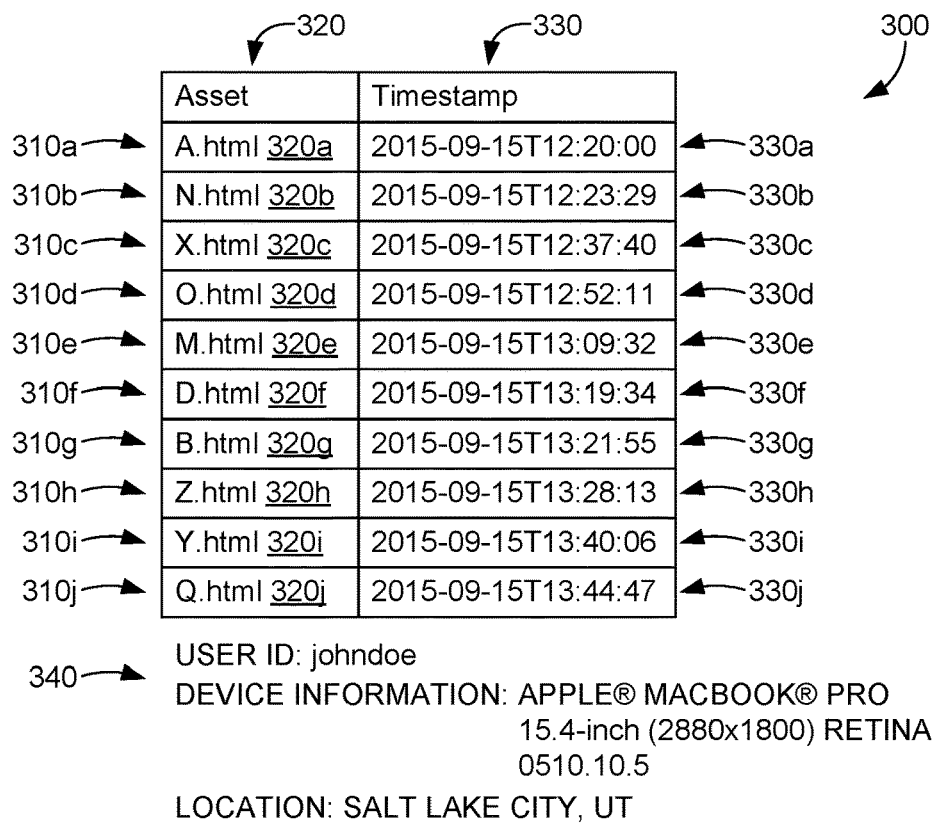
FIG. 3 is a diagram illustrating an exemplary clickstream, in accordance with some implementations of the present disclosure.

The dataset analysis component 210 is configured to analyze a resource's clickstreams by collectively processing the resource's clickstreams through a maximal sequential pattern algorithm 215, as will be described. A single clickstream is typically associated with one non-analyst user of the resource. With brief reference to FIG. 3, an exemplary clickstream 300 associated with a non-analyst user of a resource is provided. A clickstream associated with a resource includes a series of records that each references an asset of the resource. Each record can include details regarding the associated user's interaction with the referenced asset of the resource. For example, a record can include a reference to the asset, a timestamp of when the asset was accessed, a duration of interaction, a reference to the referring asset, a reference to the following asset, a unique user identifier, metadata associated with the user, detected computing device and/or software information, and/or other notable actions associated with the asset. The illustrated clickstream 300 includes a plurality of records 310a-310j that describes the entire navigational route of the resource taken by the non-analyst user with unique identifier "johndoe." In the exemplary clickstream 300, each record 310a-310j references the names 320a-320j of the assets 320 accessed by the user. Moreover, each record 310a-310j further references a temporal reference 330 corresponding to a timestamp 330a-330j recorded when each of the assets were accessed by the user. The exemplary clickstream 300 also includes general information 340 associated with the user's clickstream, which among other things, may include the user's unique identifier, collected device information, and/or a detected geographic location of the user.

Figure 2:
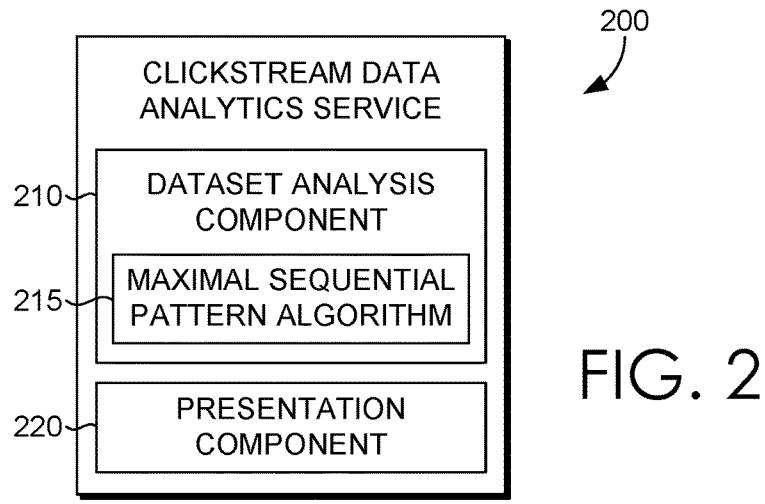
FIG. 2 is a diagram illustrating an exemplary clickstream data analytics service, in accordance with some implementations of the present disclosure.

Looking back now at FIG. 2, the maximal sequential pattern algorithm 215 is configured to obtain a set of (at least two) clickstreams, and compare the clickstreams to identify any navigational patterns that are sequentially common to at least some of the clickstreams in the set. In other words, the maximal sequential pattern algorithm 215 can compare multiple users' clickstreams to identify whether any two or more of the users, as indicated by their associated clickstreams, have common navigational patterns. For instance, and by way of a non-limiting example, assume ten out of ten users have independently navigated through a website that included webpages "A.html," "B.html," "C.html," "D.html," "E.html," etc., continuing on to "Z.html." If the users' associated clickstreams indicate that the users started at "A.html," took various paths getting to "D.html," while not commonly accessing the same webpage on the way (e.g., "B.html"), and ultimately ended their browsing session at any one of webpages "F.html" through "Z.html," at least one navigational step of a navigational pattern that is common to the users (as indicated by way of their associated clickstreams) may be identified as "A.html to D.html." In this regard, a navigational pattern associated with at least some of the users' clickstreams can include at least one navigational step that is commonly identified therein. In the aforementioned example, one of the identified steps is "'A.html' to 'D.html.'".

As was described, a navigational pattern may include one or more navigational steps. A navigational step is, in essence, two references to assets (e.g., "A.html" and "D.html," "A.html" and "A.html," "D.html" and "C.html") that are identified as being commonly accessed by all users, sequentially but not necessarily consecutively, according to the users' clickstreams in any given set of clickstreams. More specifically, and by way of example only, a navigational step of "'A.html' to 'D.html'" indicates that, according to a given set of clickstreams, each user accessed "A.html" and, at some point thereafter, accessed "D.html." The users may have accessed other webpages between "A.html" and "D.html," however. If, by way of example only, all clickstreams in the given set indicate that "B.html" was accessed at some point after accessing "A.html," but before accessing "D.html," then the navigational pattern associated with the clickstreams may include navigational steps: "'A.html' to 'B.html'" and "'B.html' to 'D.html.'" To this end, "A.html," "B.html," and "D.html" were sequentially accessed by all users, in accordance with their associated clickstreams. As such, "B.html" was sequentially accessed after "A.html," while "D.html" was sequentially accessed after both "A.html" and "B.html."

In more detail, "sequential" or "sequentially" is defined as occurring in a particular order, but not necessarily occurring in consecutive order. For example, assume a set comprises the ordered elements {A, U, H, S, O, J}. While subsets {A, U}, {U, H, S}, {H, S, O}, and {O, J} each demonstrates combinations of elements occurring in consecutive order, subsets {A, U}, {A, J}, {U, S, J}, and {H, O, J} each demonstrate combinations of elements occurring in sequential order, but not necessarily in consecutive order.

It is further contemplated that a navigational pattern identified for at least some, if not all clickstreams associated with a resource, can include more than one navigational step. For instance, if the clickstream data indicates that all of the users accessed "A.html," and sequentially (at some point in their navigational path) accessed "D.html," and at some point thereafter, before reaching a final destination page, all users access "Q.html," then another navigational step of the navigational pattern that is common to the users is "'D.html' to 'Q.html.'" To this end, the identified navigational pattern associated with the set of clickstreams may reference the sequentially-common assets "A.html," "D.html," and "Q.html." In other words, the navigational pattern can include the navigational steps "'A.html' to 'D.html'" and "'D.html' to 'Q.html.'" While the aforementioned examples analyze individual assets (e.g., webpages "A.html," "B.html," etc.) for identifying navigational patterns, it is contemplated that more abstracted levels of patterns can be identified. For instance, navigational patterns can be identified between sections of a resource (e.g., a website or application) that each include a number of assets (e.g., webpages, interfaces, interactive modules). For example, a first section of a website may include webpages "A.html," "B.html," and "C.html," while a second section of the website may include webpages "D.html," E.html," and "F.html." In this regard, navigational patterns can be determined by identifying navigational patterns of website sections accessed by users, instead of the webpages individually accessed. In one embodiment, the users' clickstreams may specifically include a reference to the website section for analysis by the dataset analysis component 210. In another embodiment, the dataset analysis component 210 can be configured to abstract one or more assets (e.g., webpages) into sections to which they belong. This can be accomplished by, as a non-limiting example, implementing an operation for reassigning, renaming, and/or categorizing assets into specific sections, based on the asset name or identifier.

Navigational patterns can be identified for some, or even all clickstreams associated with a resource. Ideally, the navigational patterns associated with the greatest number of clickstreams may be considered more relevant than a navigational pattern associated with only a couple of clickstreams. In this regard, the maximal sequential pattern algorithm 215 can be configured to identify any number of navigational patterns, with each navigational pattern being associated with a set of clickstreams from a plurality of clickstreams. The more clickstreams in a set that can be associated with an identified navigational pattern, the greater relevance or "popularity" the navigational pattern has with respect to the resource. In some instances, the number of identified navigational patterns can be limited by a minimum percentage (e.g., 50%) of clickstreams that must be associated with an identified navigational pattern, or in other instances, a minimum number (e.g., 2) of clickstreams that must be associated with an identified navigational pattern.

In some embodiments, after the navigational patterns are identified, a representation of the identified navigational patterns can be provided for display (e.g., to a monitor or other graphics display). In this regard, the clickstream data analytics service 200 can further include a presentation component 220 that is configured to generate and provide for display an interactive navigational framework for viewing and/or navigation by analysts. The presentation component 220 is configured to generate the framework based on the identified navigational patterns, to facilitate, for analysts, a navigable summary of popular navigational routes of the resource traversed by its non-analyst users.

Figure 4:
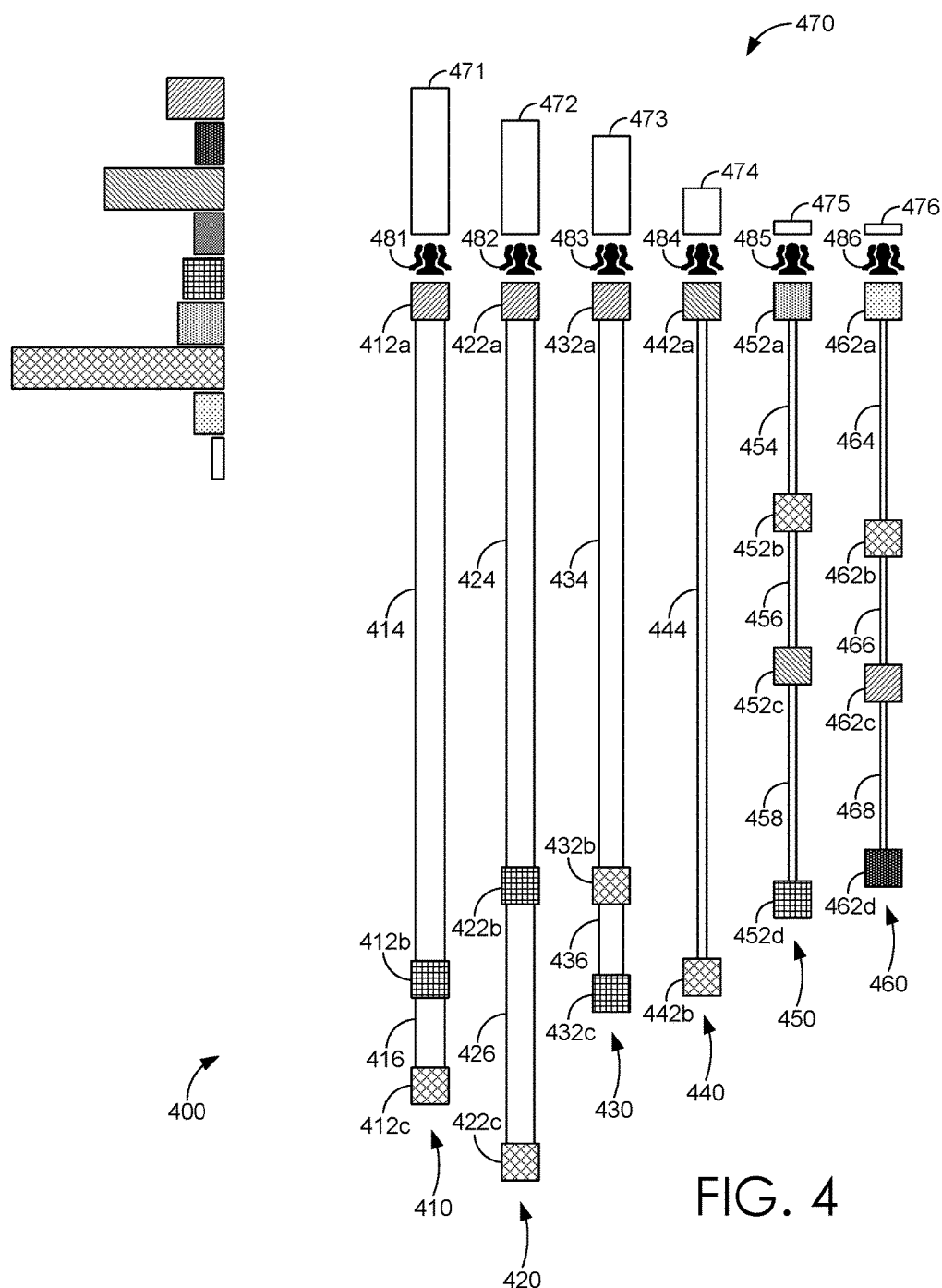
FIG. 4 is an exemplary user interface provided by the clickstream data analytics service, providing several representations of navigational patterns associated with various sets of clickstreams, in accordance with some implementations of the present disclosure.

Looking now at FIG. 4, provided is an exemplary user interface 400 provided by the clickstream data analytics service, revealing navigational patterns associated with various sets of clickstreams. Each navigational pattern 410, 420, 430, 440, 450, 460 is delineated by a representation of assets 412a-412c, 422a-422c, 432a-432c, 442a-442b, 452a-452d, 462a-462d, or in some instances sections, to illustrate the navigational steps (represented as interconnecting lines 414, 416, 424, 426, 434, 436, 444, 454, 456, 458, 464, 466, 468) that in combination, reveal the identified navigational pattern 410, 420, 430, 440, 450, 460. For example, if one identified navigational pattern (for instance, navigational pattern 410) was comprised of assets "'A.html' to 'D.html' to 'Q.html'" in sequence, the pattern may be illustrated (e.g., in top-down or left-to-right sequence) by graphical representations of each asset 412a-412c (e.g., "A.html," "D.html," "Q.html"). Each sequential graphical representation of the assets 412a-412c can be connected with a line 414, 416 (or other graphically connecting means) to represent a navigational step between each pair of referenced assets 412a-412c. In this regard, the exemplary representation of asset "A.html" can be portrayed as a colored shape (e.g., circle, square, triangle, etc.), followed in sequence by a representation of asset "D.html" also portrayed as a colored shape. The representations of assets "A.html" and "D.html" can be joined together by a line 414 that represents a navigational step (between "A.html" and "D.html") in the navigational pattern 410. Similarly, a representation of asset "Q.html" can be portrayed as a colored shape, sequentially following the representation of asset "D.html," with the representation of assets "D.html" and "Q.html" being joined together by a line 416 representing another navigational step (between "D.html" and "Q.html") in the navigational pattern 410. While the representations of assets are described as colored shapes, it is contemplated that the representations can be colored, shaped, shaded, any combination thereof, or have any distinguishing characteristic, to distinguish one particular asset or section from another particular asset or section.

As the identified navigational patterns 410, 420, 430, 440, 450, 460 are provided for display, the presentation component 220 of FIG. 2 is configured to provide the analyst with a visual representation of the popular navigational routes of accessing the various assets of the resource. In some instances, the identified navigational patterns 410, 420, 430, 440, 450, 460 can be provided for display in a ranked order 470, for instance, by the quantity of clickstreams that are identified as being associated with each navigational pattern. In some aspects, a representation of the number of clickstreams associated with each displayed representation of a navigational pattern can be provided for display therewith, for instance, as a number, a bar graph 471, 472, 473 474, 475, 476, a meter, or some other visual indicator.

The clickstream data analytics service 200 of FIG. 2 can also be configured to receive inputs (e.g., mouse-clicks, touches, hover overs, etc.) corresponding to various graphical representations generated and provided for display by presentation component 220. Receiving inputs and performing functions or actions in response thereto, can further provide the analyst with navigational control during his/her analysis of the clickstream data. For instance, once the identified navigational patterns 410, 420, 430, 440, 450, 460 are provided for display, the clickstream data analytics service 200 can be further configured to receive inputs associated with any one of the identified navigational patterns 410, 420, 430, 440, 450, 460, which can be further configured to modify the graphical representations provided for display.

In one embodiment, each representation of the identified navigational patterns 410, 420, 430, 440, 450, 460 can include a set analysis control button 481, 482, 483, 484, 485, 486 that can be configured to, upon user selection or corresponding input, narrow the visual summary provided for display to focus specifically on a single navigational pattern (and its associated clickstreams) that corresponds with the selected set analysis control button 481, 482, 483, 484, 485, 486.

Figure 5:
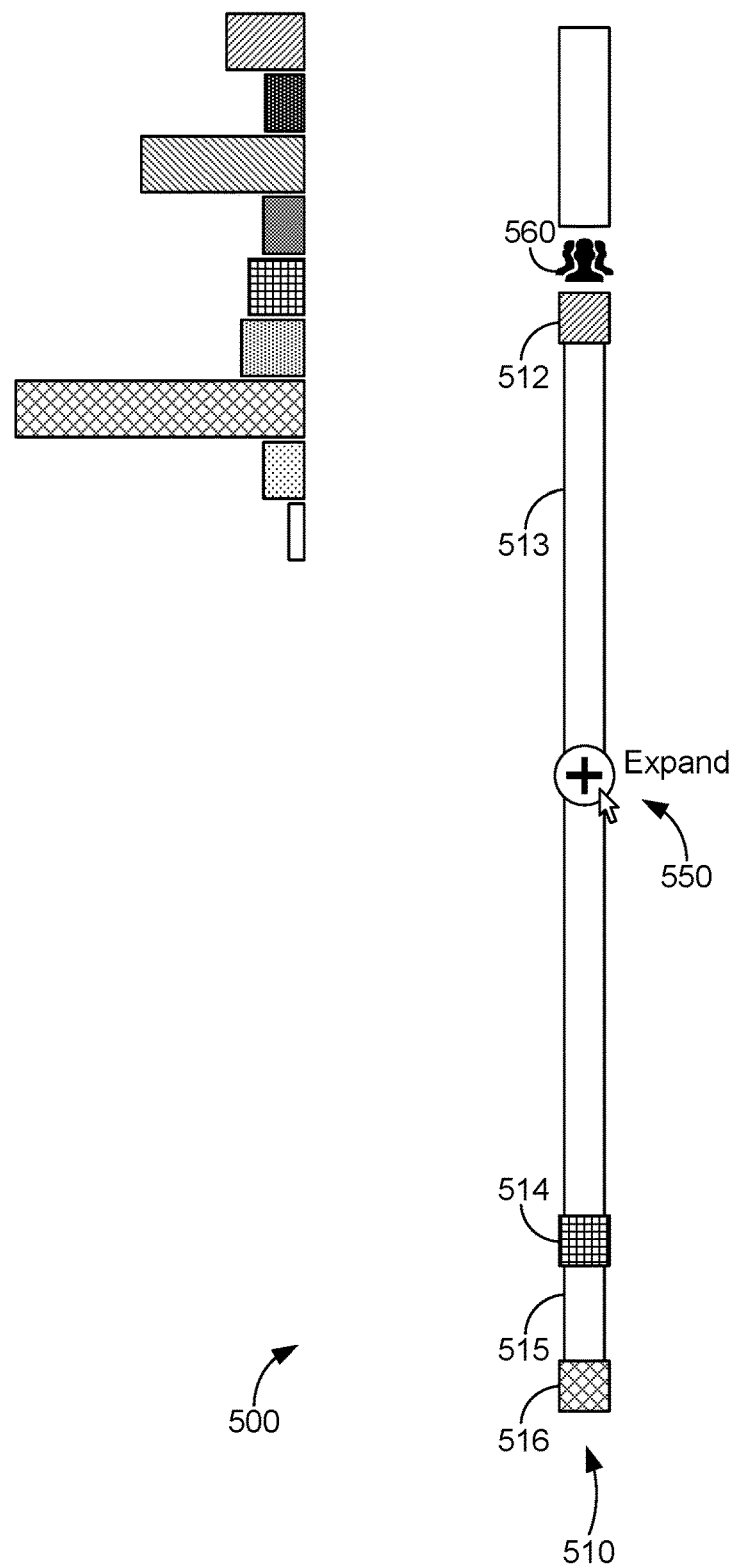
FIG. 5 is an exemplary user interface provided by the clickstream data analytics service, providing a representation of a selected navigational pattern and an input being received, in accordance with some implementations of the present disclosure.

With reference now to FIG. 5, an exemplary user interface 500 of the clickstream data analytics service is provided, illustrating a single navigational pattern 510. Assuming that the analyst is particularly interested in one navigational step of the represented navigational pattern 510, the clickstream data analytics service 200 of FIG. 2 can be configured to receive an input corresponding to the representation of the navigational step of interest. More specifically, the analyst can selectively indicate interest in a particular navigational step of a particular navigational pattern by providing an input (e.g., a mouse click, touch, hover over, etc.) corresponding to the line that connects the assets that delineate the navigational step. By way of example only, if the analyst is particularly interested in accessing more detail related to the navigational step between representation of asset "A.html" 512 to representation of asset "D.html" 514, from the representation of navigational pattern "'A.html' to 'D.html' to 'Q.html'" 510, the analyst may selectively provide an input 550 that corresponds to the line 513 connecting the representations of assets "A.html" 512 to "D.html" 514.

In response to receiving the input 550 corresponding to the representation of a selected navigational step 513, the clickstreams associated with the corresponding navigational pattern 510 are analyzed to identify another navigational pattern that is associated with some, if not all, of the associated clickstreams. However, in response to the selection of the navigational step, only a portion of each clickstream in the clickstreams associated with the corresponding navigational pattern are analyzed. More specifically, only portions from each of the corresponding clickstreams, particularly between the referenced assets delineating the selected navigational step, are analyzed to identify navigational patterns therein. In essence, a subsequent analysis is performed using the clickstreams associated with the selected navigational step, to determine another navigational pattern, particularly between the referenced assets of the selected navigational step.

By way of example only, assume one-hundred different users were independently browsing a website that included webpages "A.html," "B.html," "C.html," "D.html," "E.html," etc., continuing on to "Z.html." Also, let us assume that one of the identified navigational patterns 510 identified as being common to only ten of the one-hundred users is "'A.html' 512 to 'D.html' 514 to 'Q.html 516.'" If an input 550 is received selecting any portion of the identified navigational pattern 510, then only the clickstreams corresponding to the selected identified navigational pattern 510 are analyzed. If the input 550 received corresponds to the representation (e.g., the connecting line) of selected navigational step 513 between "A.html" 512 and "D.html" 514, then only the clickstreams that correspond to the navigational pattern 510 are analyzed. Moreover, the clickstreams that correspond to the navigational pattern 510, particularly between (but inclusive of) the assets 512, 514 referenced by the selected navigational step 513, are analyzed to identify further navigational patterns therein. To this end, selected portions of a set of clickstreams corresponding to a particular navigational pattern are analyzed by the maximal sequential pattern algorithm, as was described above. Continuing by way of the above example, the analysis identifies, for at least a subset of the particular set of clickstreams, popular navigational routes taken between the assets "A.html" and "D.html" (the assets referenced by the selected navigational step 513).

Assume that an input 550 is received corresponding to a selected representation of navigational step "'A.html' to 'D.html'" 513. If determined, according to the ten non-analyst users' clickstreams, that five of the ten users each sequentially accessed "X.html" between accessing "A.html" and "D.html," a navigational pattern identified for the five users' clickstreams may look like "'A.html' to 'X.html' to 'D.html.'" In some instances, clickstream data may indicate that more than one asset was commonly and sequentially accessed by the users. For example, if the five users each sequentially accessed asset "X.html" and "M.html" between accessing "A.html" and "D.html," then the navigational pattern identified for the five users' clickstreams may look like "'A.html' to 'X.html' to 'M.html' to 'D.html.'"

In some embodiments, representations of the identified navigational patterns corresponding to a selected navigational step can be provided for display, in response to receiving the input 550 corresponding to the selected navigational step 513.

Figure 6:
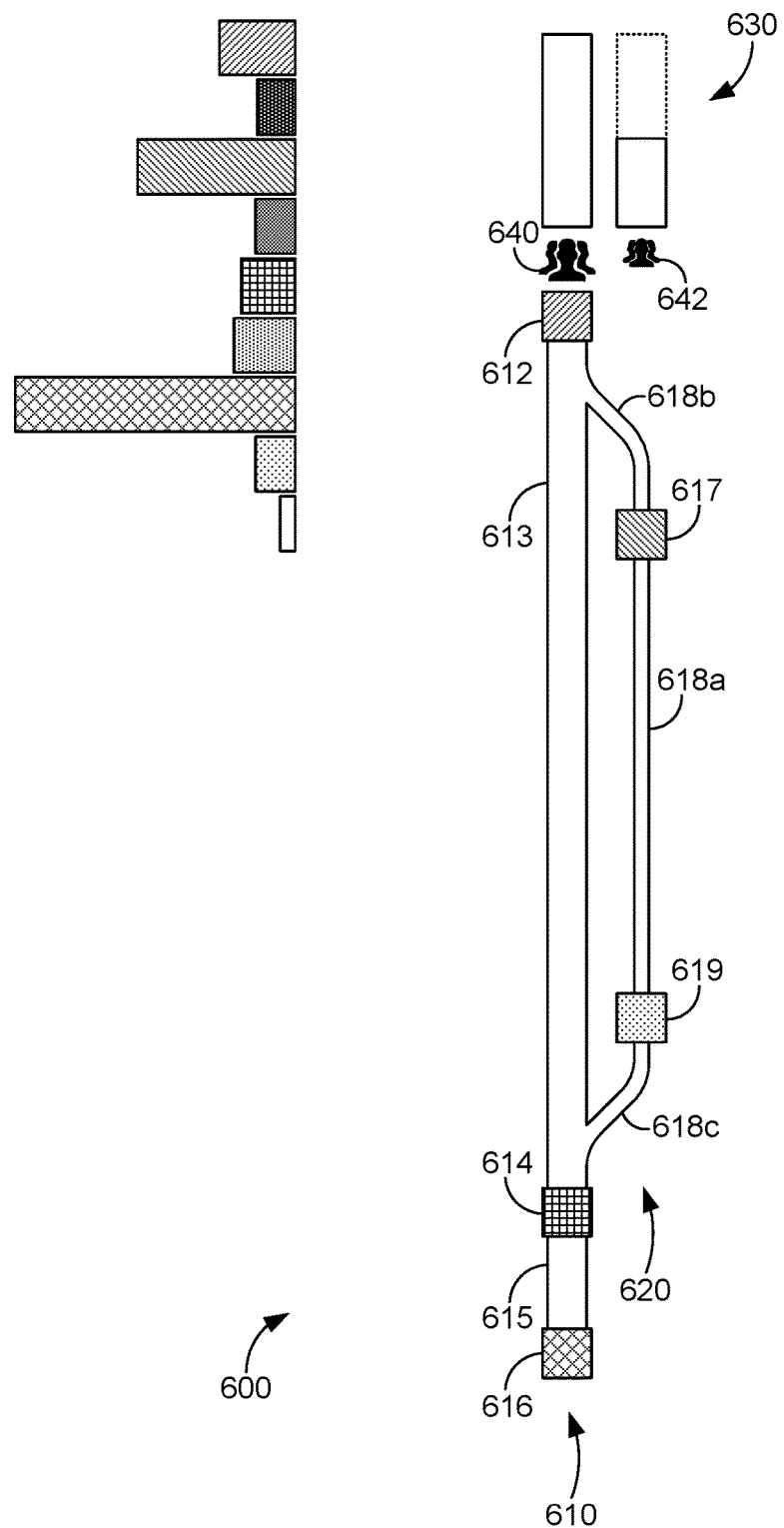
FIG. 6 is an exemplary user interface provided by the clickstream data analytics service, providing another representation of a navigational pattern identified in response to a received input, in accordance with some implementations of the present disclosure.

As was demonstrated in the illustration of FIG. 4, navigational patterns 410, 420, 430, 440, 450, 460 for a resource's clickstreams can be identified and provided for display. In accordance with embodiments described herein, and using FIG. 5 for example purposes only, if a navigational step 513 of a particular identified navigational pattern 510 is selected 550, more navigational steps for the identified navigational pattern 510, particularly falling within the selected navigational step 513, are identified and provided for display. That is, portions of the clickstreams corresponding to the particular identified navigational pattern 510 are further analyzed, in response to the selection, to identify more navigational patterns. The portions of the clickstreams analyzed are determined based on the assets 512, 514 that delineate the selected navigational step 513. With reference now to FIG. 6, an exemplary user interface 600 of the clickstream data analytics service is provided that illustrates, among other things, an identified navigational pattern 620 associated with a portion of at least a subset of clickstreams. Branching out from the representation of the navigational pattern 610, particularly between the representations of assets "A.html" 612 and "D.html" 614, another navigational pattern 620 associated with a subset of the set of clickstreams is generated and provided for display in response to receiving the input 550 corresponding to the selected navigational step 613.

For example, a navigational pattern identified in response to the selected navigational step 613 may comprise assets (or "sections") "'A.html' to 'X.html' to 'M.html' to 'D.html,'" in sequence. As such, the navigational pattern can be illustrated by graphical representations of each asset in sequence (e.g., "A.html" 612, "X.html" 617, "M.html" 619, "D.html" 614). Each graphical representation of the assets 612, 617, 619, 614 are connected with a line 618b, 618a, 618c (or other graphically conjoining means) to represent a navigational step between each pair of assets. In this regard, the representation of asset "A.html" 612 can be portrayed as a colored shape (e.g., circle, square, triangle, etc.), followed in sequence by representations of assets "X.html" 617, "M.html" 619, and "D.html" 614, each similarly-portrayed as a colored shape.

The representations of assets "A.html" 612, "X.html" 617, "M.html" 619, and "D.html" 614, can be joined together by lines 618b, 618a, 618c. Each conjoined pair of assets represents navigational steps (between pairs "'A.html' and 'X.html;'" "'X.html' and 'M.html;'" and "'M.html' and 'D.html'") in the navigational pattern that was identified in response to the selected navigational step 613.

In some embodiments, the navigational pattern 620 that is identified in response to the selected navigational step 613 can be represented as a sub-pattern of the selected navigational step 613. For instance, in response to receiving an input 550 corresponding to the selected navigational step 613, the identified navigational pattern 620 corresponding to the selected step can appear to "branch off" or appear as a sub-pattern of the selected navigational step 613. By way of example only, a selected navigational step 613 may reference asset pair "A.html" 612 and "D.html" 614. In turn, the navigational pattern 620 identified in response to the selected navigational step 613 can reference assets "A.html" 612, "X.html" 617, "M.html" 619, and "D.html" 614. As illustrated, the representation of the selected navigational step 613 may remain in its original state, while the other assets ("X.html" 617 and "M.html" 619) identified in the navigational pattern 620 appear relatively between (inset and/or offset) the asset pair 612, 614 from the selected navigational step 613.

As was described in reference to FIG. 4, the identified navigational patterns are ranked 471-476 in accordance with a number of associated clickstreams. Similarly, the navigational patterns identified in response to a selected navigational step can be displayed in a ranked order, such as navigational pattern 620. In some aspects, the number of clickstreams associated with each navigational pattern can be displayed therewith, for instance, as a number, a bar graph 630, a meter, or some other visual indicator. While the illustration of FIG. 6 includes only one navigational pattern 620 identified in response to the selected navigational step 613, it is contemplated that in various embodiments, more than one navigational pattern identified in response to a selected navigational step 613 can be provided. If other navigational patterns are identified, they can be positioned adjacent to one another. For instance, additional navigational patterns can be provided for display adjacent to (e.g., in parallel) navigational pattern 620, and lines 618b, 618c can appear to split apart, to graphically conjoin the first and last referenced assets of the other navigational patterns.

Figure 7:
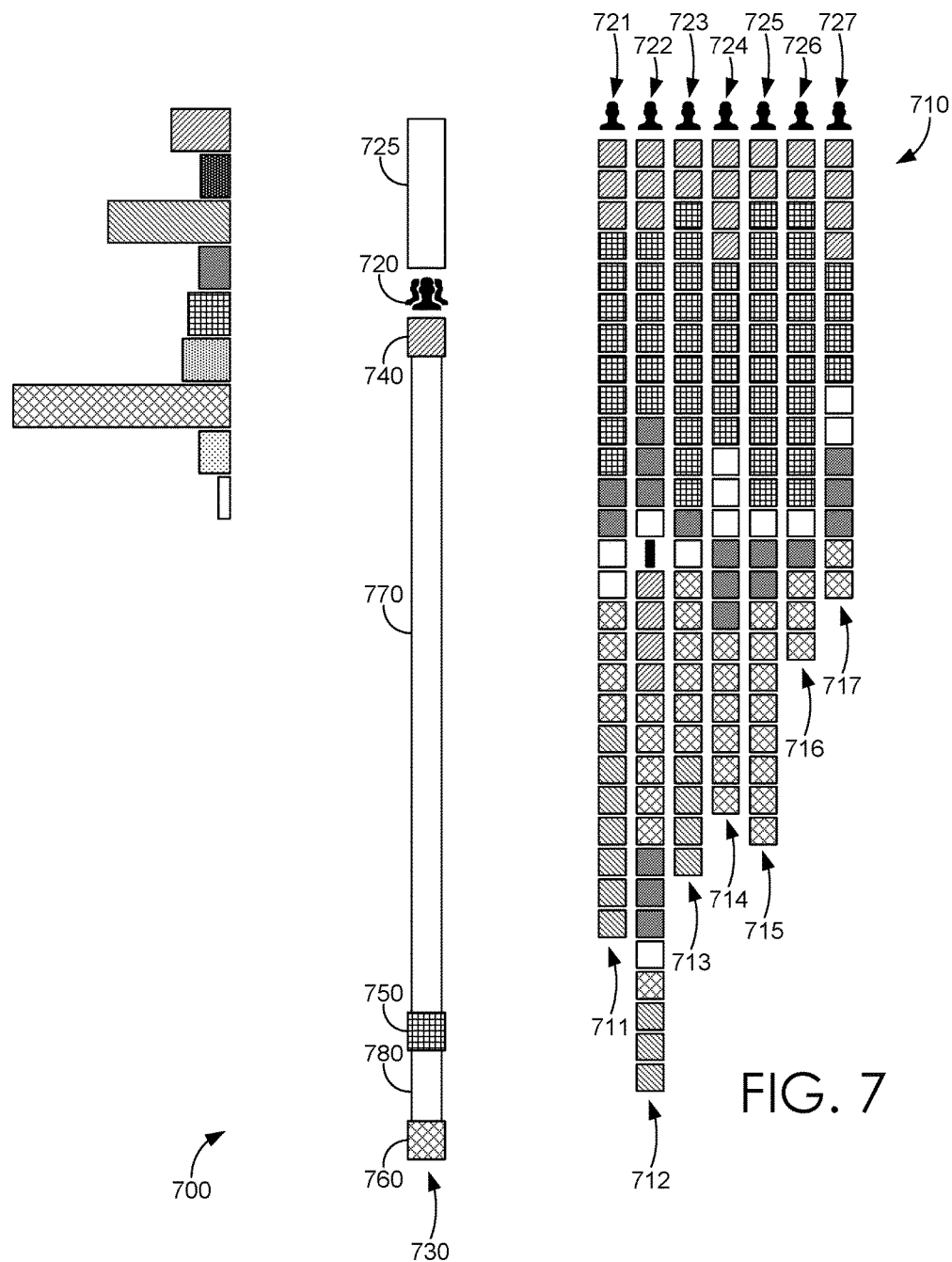
FIG. 7 is an exemplary user interface provided by the clickstream data analytics service, providing representations of individual clickstreams in a set of clickstreams, in accordance with some implementations of the present disclosure.

As the aforementioned user interfaces are generated and provided for display and/or interactive navigation by an analyst, set analysis control buttons (illustrated as control buttons 481, 482, 483, 484, 485, 486 of FIG. 4, control button 560 of FIG. 5, and control buttons 640, 642 of FIG. 6) can be configured to initialize a modification in the user interface upon selection. In more detail, in response to receiving an input corresponding to a selected set analysis control button, the clickstream data analytics service can be configured to provide for display an increased amount of detail associated with the clickstream that corresponds to the selected set analysis control button. For instance, and by way of example only, if an analyst wants to see more detail corresponding to the clickstream associated with the identified navigational pattern 610 of FIG. 6, the clickstream data analytics service can be configured to receive an input to the corresponding set analysis control button 640 to initialize a user interface change, as illustrated with reference now to FIG. 7.

The clickstream data analytics service can be configured to generate and provide for display a more detailed user interface 700 that includes graphical representations of each individual clickstream 710 corresponding to the selected set analysis control button 720. In the illustrated example, the graphical representations of the individual clickstreams 710, or "individual paths," are generated and provided for display as colored, shaped, and/or distinguishable representations of assets corresponding to each individual clickstream that is associated with the navigational pattern 730.

Figure 8:
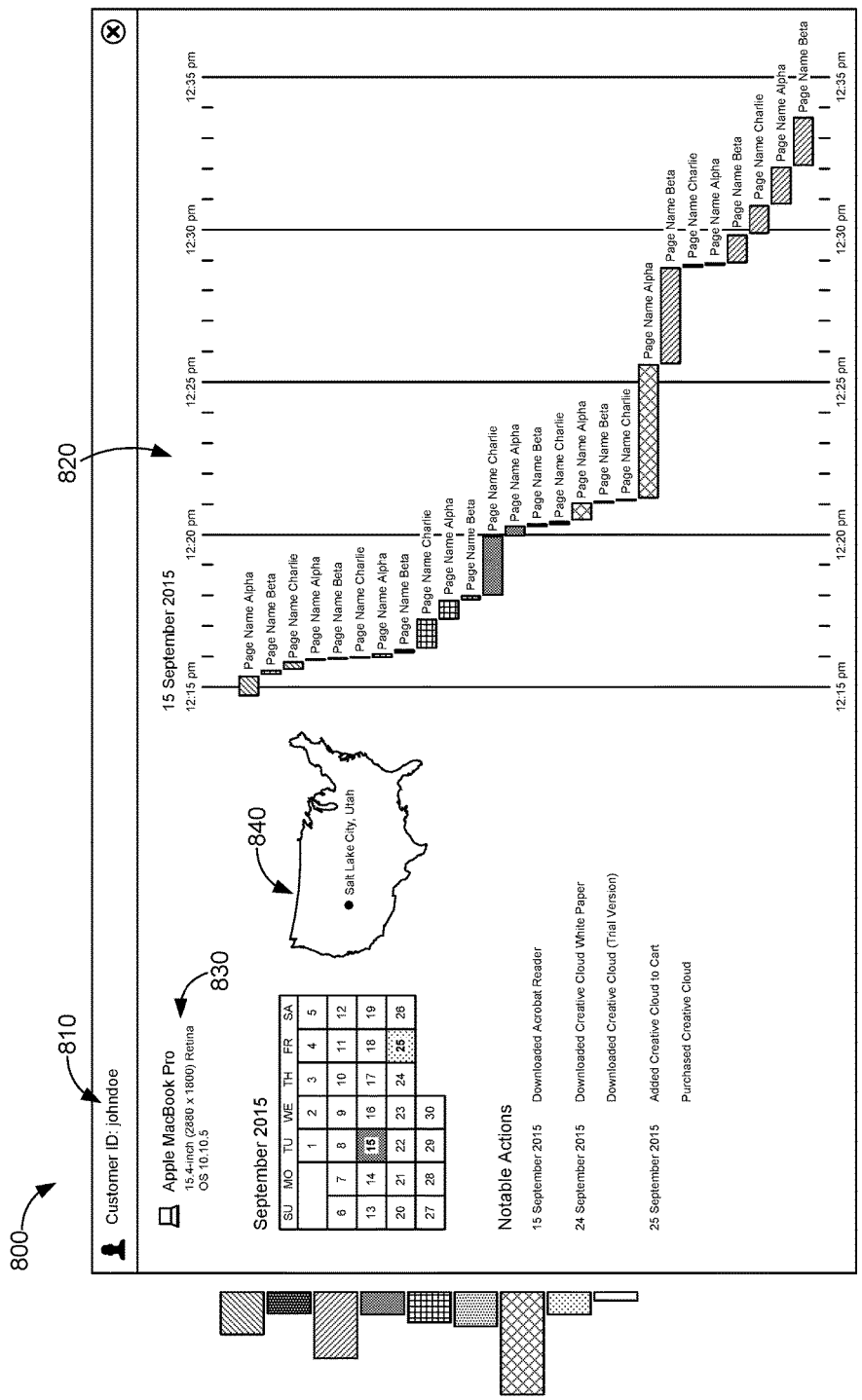
FIG. 8 is an exemplary user interface provided by the clickstream data analytics service, providing representations of low level details of a clickstream, in accordance with some implementations of the present disclosure.

Associated with the individual paths 710 are path analysis control buttons 721-727. As may be appreciated by the graphical representations thereof, each path analysis control button 721-727 (e.g., a single person) represents a single non-analyst user, while the set analysis control button 720 (e.g., a group of people) represents the set of non-analyst users. Each of the path analysis control buttons 721-727 can be configured to, upon selection via a corresponding input by an analyst, initiate a modification in the user interface. In response to receiving an input corresponding to a selected path analysis control button, such as any one of path analysis control buttons 721-727, the clickstream data analytics service can be configured to provide for display details associated with the clickstream that corresponds to the selected path analysis control button. In response to receiving an input corresponding to a selected path analysis control button, the clickstream data analytics service can be configured to generate and provide for display a user interface, such as user interface 800 of FIG. 8, providing more detail of the clickstream corresponding to the selected path analysis control button.

The user interface 800 can include a variety of low level details of the clickstream corresponding to a selected path analysis control button. By way of example only, the clickstream data analytics service can be configured to generate and/or provide for display, among other things, a non-analyst user's unique identifier 810, a graphical timeline 820 illustrating the date and time each asset was accessed by the non-analyst user, collected device information 830, a detected geographic location of the non-analyst user 840, and/or a timeline of notable actions 850 identified based on the assets accessed by the non-analyst user.

Having described various aspects of the present disclosure, exemplary methods are described below for analyzing clickstreams. Referring to FIG. 9 in light of FIGS. 1-8, FIG. 9 is a flow diagram showing a method 900 for analyzing a plurality of clickstreams associated with a resource. Each block of method 900 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 910, a plurality of clickstreams are obtained for analysis. In accordance with embodiments described herein, each clickstream in the plurality of clickstreams includes a plurality of records. Each record references one of a plurality of assets or sections associated with a resource. The resource can be any electronic resource configured for interaction and/or navigation, for instance, a website or a software application. As such, the assets associated with a website could be its webpages. The sections associations with a website could each include several webpages of the website. Similarly, the assets associated with a software application could be its various control buttons and/or user interfaces. The sections associated with a software application could each include several control buttons and/or user interfaces. Resources, as referenced herein, are not to be limited to websites or software applications, however, as various other resources are contemplated for use in accordance with embodiments described herein.

At block 920, the plurality of clickstreams are analyzed to identify at least one set of clickstreams that has a corresponding navigational pattern. In other words, each clickstream in an identified set of clickstreams must sequentially reference a common group of assets. At block 930, a navigational pattern corresponding to the identified set is determined. The navigational pattern references a collection of assets, which is, in essence, the same group of assets that were commonly referenced by each clickstream in the identified set. The collection of asset references provides a list of assets that are sequentially common to each clickstream in the identified set. Each pair of asset references that are consecutively listed in the navigational pattern represents a navigational step of the navigational pattern. At block 940, a first navigational pattern that corresponds to a first identified set of clickstreams is provided. The pattern can be provided for display, for further processing, for storage, and the like.

Referring now to FIG. 10 in light of FIGS. 1-8, FIG. 10 is a flow diagram showing a method 1000 for analyzing clickstreams. Each block of method 1000 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 1010, a plurality of clickstreams are obtained for analysis. At block 1020, at least a first navigational pattern that corresponds to a first set of clickstreams is provided. The first set of clickstreams is identified based on a first analysis that was conducted on a plurality of clickstreams associated with a resource. The first analysis identifies, from the plurality of clickstreams, at least one set of clickstreams, where each clickstream in an identified set must sequentially reference a common group of assets.

At block 1030, a second set of clickstreams (i.e., a subset of the first set of clickstreams) is identified in response to a selected portion of the first navigational pattern. The second set is identified based at least in part on the selected portion. The selected portion is, in accordance with embodiments described herein, a particular navigational step of the first navigational pattern. Each clickstream in the second set includes a common group of asset references. As the first set of clickstreams was identified based on the first analysis, the second set of clickstreams is identified based on a second analysis. The second analysis identifies, from the first set of clickstreams, at least one set of clickstreams, where each clickstream in an identified set must sequentially reference a common group of assets. In essence, while the first and second analysis are the same, the clickstreams subject to the analysis are different. The second analysis is based on the selected portion of the first navigational pattern.

At block 1040, a second navigational pattern is determined for the second identified set of clickstreams. The second navigational pattern includes a collection of asset references that are based at least in part on the common group of asset references from the second set. At block 1050, the second navigational pattern corresponding to the second identified set of clickstreams is provided. The second navigational pattern can be provided for display, for further processing, for storage, and the like.

Figure 11:
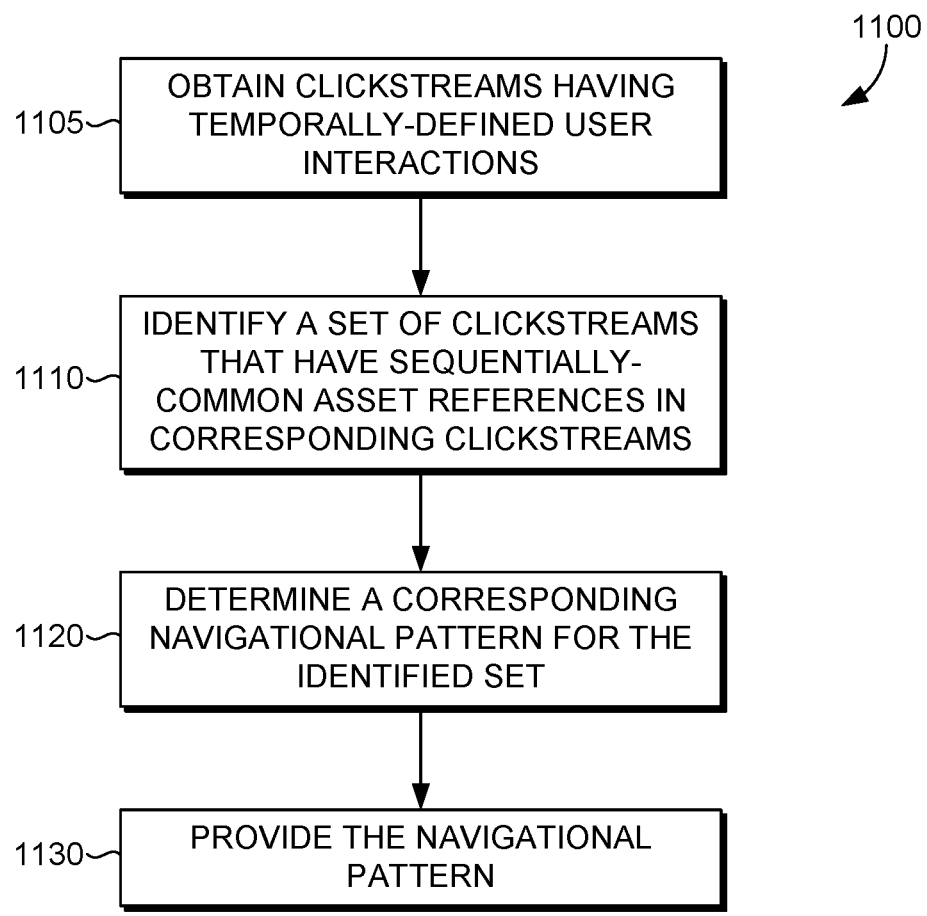
FIG. 11 is a flow diagram showing a method for analyzing clickstreams or segments thereof, in accordance with some implementations of the present disclosure.

Referring now to FIG. 11 in light of FIGS. 1-8, FIG. 11 is a flow diagram showing a method 900 for analyzing a plurality of clickstreams associated with a resource. Each block of method 1100 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 1110, a plurality of clickstreams are obtained for analysis. At block 1120, a selected plurality of clickstreams is analyzed to identify at least one set of clickstreams that includes a common group of asset references in each corresponding clickstream. In other words, based on a received input corresponding to either an entire collection of clickstreams associated with a resource or a particular navigational step of a particular navigational pattern (for instance, from a displayed navigational pattern), the clickstreams associated with the received input are analyzed to determine at least one corresponding navigational pattern.

At block 1130, a corresponding navigational pattern is determined for each identified set of clickstreams. The corresponding navigational pattern includes a collection of asset references that are based on the common group of asset references. A particular pair of asset references in the collection of asset references represents a particular navigational step of the corresponding navigational pattern. At block 1140, at least a first navigational pattern corresponding to the first identified set of clickstreams is provided for display. The pattern can be provided for display, for further processing, for storage, and the like.

Figure 12:
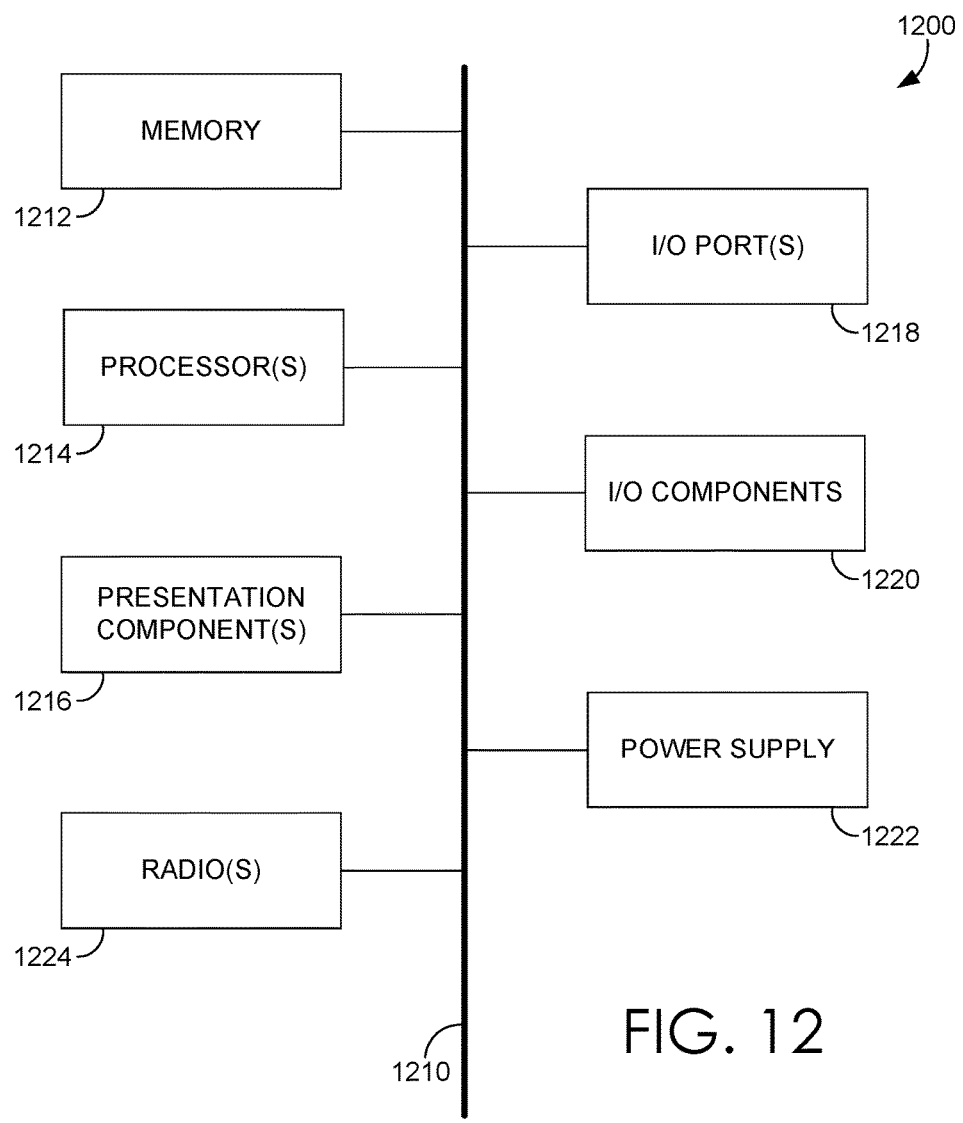
FIG. 12 is a block diagram of an exemplary computing environment suitable for use in implementations of the present disclosure.

With reference to FIG. 12, computing device 1200 includes bus 1210 that directly or indirectly couples the following devices: memory 1212, one or more processors 1214, one or more presentation components 1216, input/output (I/O) ports 1218, input/output components 1220, and illustrative power supply 1222. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer-storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc. The I/O components 1220 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1200. The computing device 1200 may be equipped with depth cameras, such as, stereoscopic camera systems, infrared camera systems, RGB camera systems, and combinations of these for gesture detection and recognition. Additionally, the computing device 1200 may be equipped with accelerometers or gyroscopes that enable detection of motion. The output of the accelerometers or gyroscopes may be provided to the display of the computing device 1200 to render immersive augmented reality or virtual reality.

As described above, implementations of the present disclosure provide for analyzing a plurality of clickstreams associated with a resource. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for generating graphical representations of complex clickstream analytics, the method comprising:
   obtaining, by a server device, a plurality of clickstream datasets that each corresponds to one of a plurality of navigation sessions, each obtained clickstream dataset referencing one or more electronic documents accessed during the corresponding navigation session, the one or more electronic document references being ordered based on a sequence in which the one or more electronic documents were accessed during the corresponding navigation session;
   identifying, by the server device, a set of clickstream datasets, from the obtained plurality of clickstream datasets, that each reference a common set of electronic documents;
   determining, by the server device, a navigational pattern for the identified set of clickstream datasets based at least in part on a determination that at least a portion of the common set of electronic documents is referenced in a common order by at least a portion of the identified set of clickstream datasets; and
   communicating, by the server device and to a client device, a generated graphical representation of the determined navigational pattern.

2. The method of claim 1, wherein the one or more electronic documents is associated with a website, and wherein each electronic document corresponds to one of a plurality of webpages or one of a plurality of sections of the website.

3. The method of claim 1, wherein the one or more electronic documents is a software application comprising a plurality of interactive modules, and wherein each electronic document corresponds to one of a plurality of interactive modules or one of a plurality of sections of the software application.

4. The method of claim 1, wherein each electronic document reference is associated with a corresponding timestamp recorded when the referenced electronic document was accessed.

5. The method of claim 1, wherein the navigational pattern includes at least one navigational step, each navigational step corresponding to a piece of the portion of the common set of electronic documents referenced in the common order by at least the portion of the identified set of clickstream datasets.

6. The method of claim 5, wherein each piece corresponds to a pair of electronic documents.

7. The method of claim 5, further comprising:
   in response to a selected navigational step of the communicated navigational pattern,
   analyzing the identified set of clickstream datasets to identify a second set of clickstream datasets based on the selected navigational step, and
   determining a second navigational pattern that corresponds to the identified second set.

8. The method of claim 7, wherein the identified second set is a subset of the identified set.

9. The method of claim 7, further comprising:
   providing the determined second navigational pattern as a segmented navigational summary corresponding to the selected navigational step.

10. The computer-implemented method of claim 1, wherein the generated graphical representation includes at least one set of navigational steps that represents the portion of the common set of electronic documents referenced in the common order.

11. A non-transitory computer storage medium storing computer-useable instructions that, when used by one or more computing devices, cause the one or more computing devices to perform operations to generate graphical representations of complex clickstream analytics, the operations comprising:
    obtaining a plurality of clickstream datasets that each corresponds to one of a plurality of navigation sessions, each obtained clickstream dataset referencing one or more electronic documents accessed during the corresponding navigation session, the one or more electronic document references being ordered based on a sequence in which the referenced one or more electronic documents were accessed during the corresponding navigation session;
    providing for display a first graphical representation of a first navigational pattern generated for a first set of clickstream datasets of the obtained plurality of clickstream datasets, the first set of clickstream datasets being determined based on an identified first set of electronic documents that is commonly referenced by each clickstream dataset in the first set of clickstream datasets, wherein the displayed first graphical representation presents at least a first segment that corresponds to an identified subset of electronic documents that is commonly referenced by at least a portion of the first set of clickstream datasets; and
    in response to a selection corresponding to the first segment, providing for display a second graphical representation that extends from the selected first segment, the second graphical representation being generated for at least the portion of the first set of clickstream datasets.

12. The medium of claim 11, wherein each electronic document of the one or more electronic documents corresponds to one of a plurality of webpages of a website or one of a plurality of sections of the website.

13. The medium of claim 11, wherein each electronic document of the one or more electronic documents corresponds to one of a plurality of interactive modules or one of a plurality of sections of a software application.

14. The medium of claim 11, wherein each commonly referenced electronic document is ordered based on a corresponding timestamp that indicates when the commonly referenced electronic document was accessed.

15. A computerized system for generating graphical representations of complex clickstream analytics, the system comprising:
    one or more processors; and one or more computer storage media storing computer-usable instructions that, when used by the one or more processors, cause the one or more processors to:

obtain clickstream datasets that each corresponds to one of a plurality of navigation sessions, each obtained clickstream dataset referencing one or more electronic documents accessed during the corresponding navigation session, the one or more electronic document references being ordered based on a sequence in which the one or more electronic documents were accessed during the corresponding navigation session;

identify, from the obtained clickstream datasets, a set of clickstream datasets that each reference a common set of electronic documents;

determine a navigational pattern for the identified set of clickstream datasets based at least in part on a determination that a subset of the set of clickstream datasets each reference, in a sequentially common order, a common subset of the common set of electronic documents; and provide for display a graphical representation of the determined navigational pattern.

16. The system of claim 15, wherein the clickstream datasets are obtained based on a received input that corresponds to one of a plurality of clickstream datasets or a displayed graphical representation of one of a plurality of segments in another navigational pattern.

17. The system of claim 15, wherein the displayed graphical representation is adapted to receive a selection that corresponds to the subset.

* * * * *